United States Patent [19]

Hutter

[11] Patent Number: 4,633,640
[45] Date of Patent: Jan. 6, 1987

[54] WALL ANCHOR OR SUPPORT

[76] Inventor: Gerhard P. Hutter, 993 Lake Ave., Greenwich, Conn. 06830

[21] Appl. No.: 843,560

[22] Filed: Mar. 25, 1986

[51] Int. Cl.$^4$ ............................................. E05D 5/00
[52] U.S. Cl. ................................. 52/704; 52/718.1; 248/231.91
[58] Field of Search ................. 52/704, 396, 397, 716, 52/718, 202, 403; 248/231.9, 231.91

[56] References Cited

U.S. PATENT DOCUMENTS

| | | | |
|---|---|---|---|
| 780,957 | 1/1905 | Palmer | 248/231.91 |
| 3,846,948 | 11/1974 | Dallen | 52/396 X |
| 3,923,411 | 12/1975 | Berghman | 52/396 X |
| 4,179,859 | 12/1979 | Fricko et al. | 52/718.1 X |

FOREIGN PATENT DOCUMENTS

| | | | |
|---|---|---|---|
| 1159702 | 12/1963 | Fed. Rep. of Germany | 248/231.91 |
| 1196841 | 7/1965 | Fed. Rep. of Germany | 52/704 |
| 387262 | 1/1965 | Switzerland | 52/704 |
| 442667 | 1/1968 | Switzerland | 248/231.91 |

Primary Examiner—J. Karl Bell
Attorney, Agent, or Firm—Alfred E. Miller

[57] ABSTRACT

A wall anchor or support comprising a support end portion and a shank portion, a plurality of spaced triangular shaped members affixed to the shank and capable of limited pivotal movement when the shank is inserted in an opening in a wall structure and when force is applied to the anchor in a direction away from the wall structure. The plurality of spaced triangular shaped members have a curved surface and two straight side surfaces with the side surfaces being connected together at adjacent ends forming a joint and the curved surface frictionally gripping an interior surface of the opening when the force applied to the wall anchor in a direction away from the wall is applied, thereby preventing the wall anchor from being dislodged from the wall structure.

6 Claims, 13 Drawing Figures

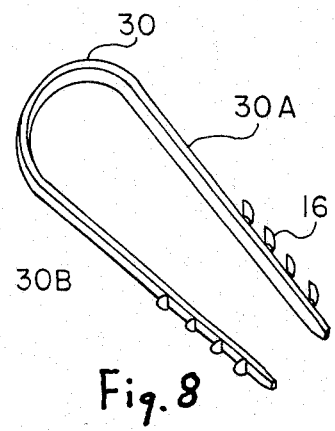
Fig. 8
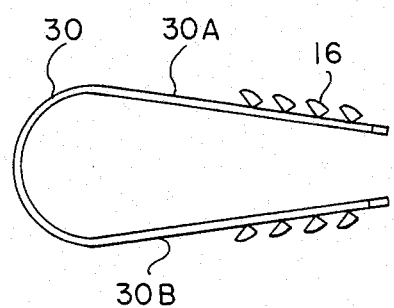
Fig. 9
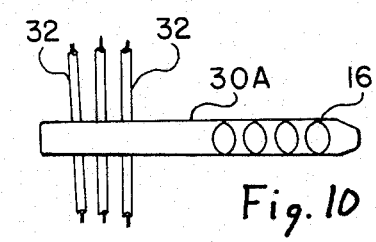
Fig. 10
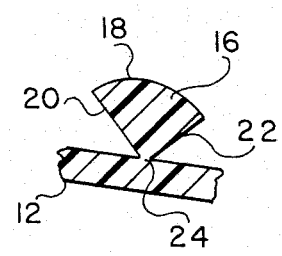
Fig. 11
Fig. 12
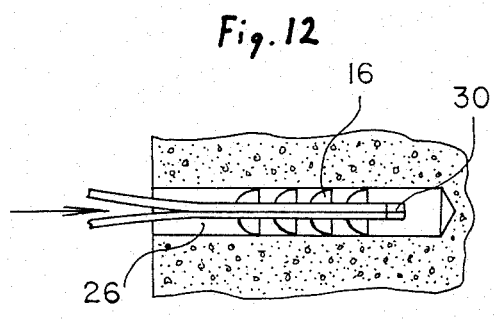
Fig. 13
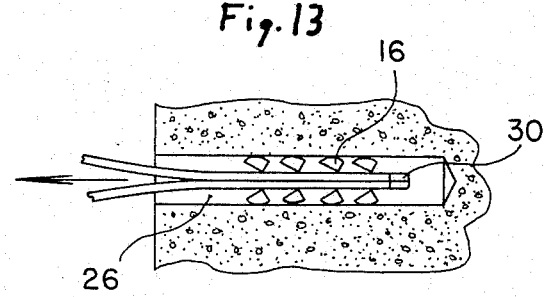

WALL ANCHOR OR SUPPORT

The present invention relates to a securing device to be affixed to walls, such as a masonry, brick, or any other stable wall surface. It is an object of the present invention to provide a wall anchor which is inexpensive to manufacture yet is reliably effective for the purposes intended. Each of the wall anchors is provided with a shank portion and a plurality of spaced, triangular-shaped members, each having a curved gripping surface, and straight sides affixed to the shank portion at the junction thereof, the straight or linear sides being joined at a point or junction opposite the curved gripping surface. Means are provided for securing the junction to said shank whereby each of the triangular-shaped members are adapted to pivot in a limited manner when said shank is inserted in an opening in said wall surface whereby one of said straight sides on each member is moved to a position parallel to and juxtaposed to said shank while the other straight side is disposed at substantially right angles to said shank.

It should be noted that the free end configurations of the wall anchor can be varied in accordance with the requirements of the user. For example, the end configuration may take the form of a bend, so that the hook-like end may be adapted to hold a cable, wiring, or provide a support for a heavy object to be suspended therefrom. On the other hand, the free end of the wall anchor may take the form of a loop which functions as a harness for a series of wires held between the legs thereof.

In order to securely hold the shank portion of the wall anchor in the opening in the wall, it is necessary that the shank portion together with the pivotable triangular-shaped members are inserted in the opening, as seen in FIG. 6. When the shank portion is pulled in a direction out of the wall, as seen by the arrow in FIG. 7, the pivoting triangular-shaped members rotate, so that the radius, or curved gripping surface of each triangular-shaped member, engages with considerable force on the inner surface of the opening to thereby firmly maintain the shank of the wall anchor in the wall structure, with the curvilinear surfaces "biting" further into the inner surface of the wall opening as more force is applied in the direction of the arrow shown in FIG. 7.

In order that the present invention will be more clearly understood, it will now be disclosed in greater detail with reference the accompanying drawings in which:

FIG. 8 is an alternate embodiment of the present invention in which a wall anchor is U-shaped, and is provided with pivoting triangular-shaped members having gripping surfaces on both legs of said wall anchor.

FIG. 9 is a front elevational view of the wall anchor shown in FIG. 8.

FIG. 10 is a side elevational view thereof.

FIG. 11 is an enlarged view of one of the triangular-shaped members of said wall anchor.

FIG. 12 shows the wall anchor of FIG. 8 inserted in an opening in an masonry wall and FIG. 13 shows the wall anchor of FIG. 8 after being inserted in the opening of said masonry wall and having a force applied to it in the direction of the arrow.

Figure 1:
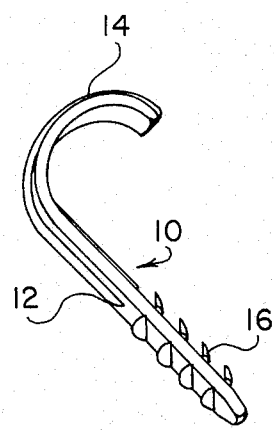
FIG. 1 is a perspective view of a wall anchor support device having a hook-shaped end and constructed in accordance with the teachings of the present invention.
Figure 2:
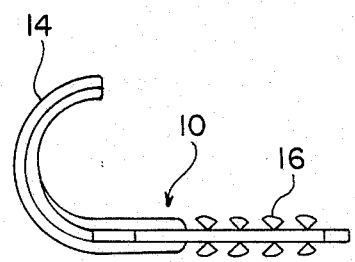
FIG. 2 is a side elevation of the wall anchor shown in FIG. 1.
Figure 3:
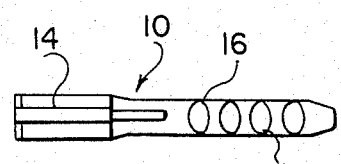
FIG. 3 is a front elevational view thereof.

As seen in FIGS. 1-7 a support element, or anchoring device, is shown for use in connection with a masonry or wood construction wall and referred to generally by the reference numeral 10. The wall anchor as seen in FIGS. 1-3 is provided with a shank portion 12 and a hook 14 at its free end. A plurality of triangular-shaped members 16 are seen in which a series of members are connected in a spaced manner on one side of said shank while another series of members are connected in a spaced manner on the opposite side thereof.

Figure 4:
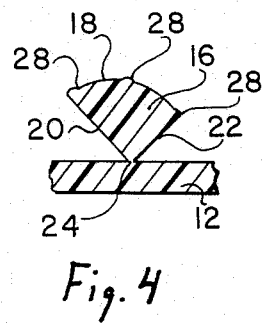
FIG. 4 is an enlarged view showing a triangular-shaped member gripping section in which a curved gripping surface is in position to engage the inner surface of a hole in the masonry, or the like, wall section.
Figure 5:
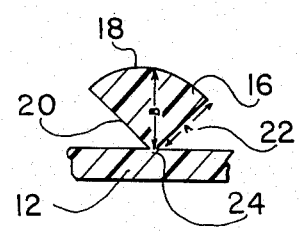
FIG. 5 is a view of one of the gripping surfaces of a triangular-shaped member when the wall anchor is inserted in an opening in a masonry wall, such as shown in FIG. 6.
Figure 6:
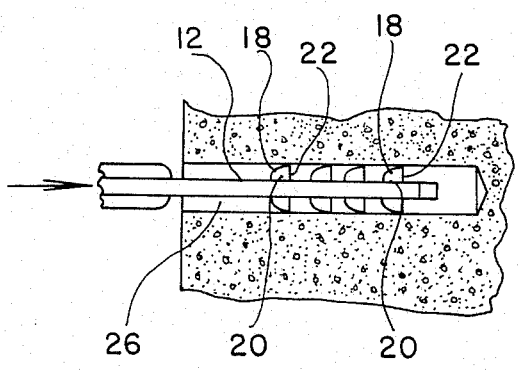
FIG. 6 shows a wall anchor being inserted in a hole in a masonry wall.
Figure 7:
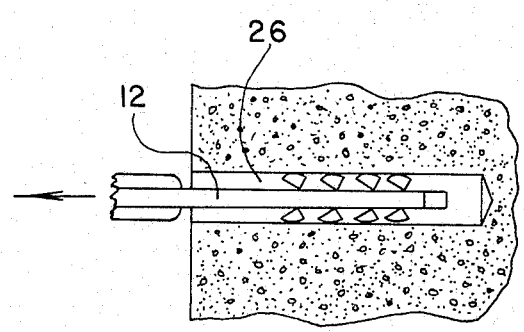
FIG. 7 shows a wall anchor after being inserted in an opening in a masonry wall.

Referring to FIG. 4, in particular, each triangular-shaped member 16 is provided with a curved gripping surface 18 and straight or linear sides 20 and 22. The sides 20 and 22 are joined together at the junction 24. It will be observed that the junction 24 is affixed to the shank portion 22 of the wall anchor so that there is a point connection for each of the triangular shaped members to the respective shank portion. This construction and arrangement permits each triangular-shaped member to the pivot in a limited manner, as seen in FIGS. 5-7. Thus, when shank portion 12 of wall anchor 10 is inserted in the opening 26 in a masonry wall, or the like structure, each triangular-shaped member is adapted to pivot so that the straight or linear sides 20 abut and engage the shank 12 and these sides 20 are disposed parallel to the longitudinal axis of the shaft 12 of the wall anchor. As seen in FIG. 5, it will be noted that the dimension A, which is side 22, is less than the dimension B. Thus, it will be evident that when forces are applied to the wall anchor in the direction of the arrow shown in FIG. 7, the triangular-shaped members 16 will pivot in a clock-wise direction so that the curved gripping surface will frictionally engage the inner surfaces of the opening 26. Moreover, as more force is applied in the direction of the arrow shown in FIG. 7, the gripping surfaces 18 will more firmly engage or "bite" into the inner surfaces of opening 26, thus preventing the wall anchor from being dislodged from its position in the opening 26 of the wall.

As seen in FIG. 4, projections 28 are located in spaced relationship on the gripping surface 18. These projections are particularly suitable for insertion in an opening in a softer wall structure, such as wood, whereby the projections further frictionally engage in the interior of the opening in the wood (not shown) in order to prevent dislodgement of the wall anchor from a wooden wall, or a wall of similar material.

As seen in FIGS. 8-13, another form or embodiment of the present invention is a U-shaped wall anchor, which has the appearance of an enlarged hairpin. In this embodiment a plurality of triangular-shaped members 16, similar to that shown in FIG. 1, are secured to the legs 30A and 30B of wall anchor 30. It will be noted that each of the triangular-shaped members 16 has the same configuration as that shown in FIGS. 4 and 5, and are adapted to pivot in the same manner.

The wall anchor 30 is particularly suitable for holding and supporting a plurality of wires and serving as a harness therefor. Such an arrangement is particularly shown by the reference numeral 32 in FIG. 10. FIGS. 12 and 13 illustrate the insertion of wall anchor 30 in a masonry wall and the pivoting action of the triangular-shaped members 16 when forces apply in a direction shown by the arrow of FIG. 13. It is obvious that other constructions and embodiments of the invention may be made, such as an eye or a double hook facing in opposite directions, at the free end being the holding or support portion of the wall anchor. Thus, although the present invention has been disclosed and described with reference to two embodiments, it should be apparent that other variations and modifications may be made, and it is therefore intended in the following claims to cover each such variation and modification as follows within the true spirit and scope of the invention.

I claim:

1. A wall anchor or support for insertion in an opening in a wall structure comprising a support end portion and a shank portion, a plurality of members each having a curved surface and two straight side surfaces, said side surfaces being connected together at adjacent ends to form a joint which is affixed to said shank at spaced locations thereon whereby said members are capable of limited pivotal movement when said shank is inserted in said opening and when force is applied to said wall anchor in a direction away from said wall structure whereby said curved surfaces of said members pivot to frictionally grip an interior surface of said opening to thereby prevent the wall anchor from being dislodged from said wall structure.

2. A wall anchor as claimed in claim 1 wherein each of said members are triangular shaped.

3. A wall anchor as claimed in claim 2 further provided with spaced projections on said curved surface of at least one of said triangular shaped members.

4. A wall anchor as claimed in claim 2 wherein one of said straight sides of each of said triangular shaped members is pivoted to a position whereby said one side is substantially parallel to the longitudinal axis of said shank when said wall anchor is inserted in said opening.

5. A U-shaped wall anchor or support for insertion in an opening in a wall structure comprising a bight support portion and a pair of spaced legs for insertion in said opening, a plurality of members each having a curved surface, and two straight side surfaces, said side surfaces being connected together at adjacent ends to form a joint which is affixed to said legs at spaced locations thereon, whereby said members are capable of limited pivotal movement when said legs are inserted in said opening, and said curved surfaces of said members pivot when force is applied to said wall anchor in a direction away from said wall structure to frictionally grip an interior surface of said opening to thereby prevent the wall anchor from being dislodged from said wall structure.

6. A wall anchor as claimed in claim 2 wherein when force is applied to said wall anchor in a direction away from said wall structure the curved gripping surfaces of said triangular-shaped members which pivot at said joint frictionally engage the interior surface of said opening, thereby preventing dislodgment of said wall anchor from the dislodgement of said wall anchor from the opening in said wall structure.

* * * * *